(12) United States Patent
Khandelwal et al.

(10) Patent No.: US 7,058,964 B2
(45) Date of Patent: *Jun. 6, 2006

(54) FLEXIBLE DIGITAL CABLE NETWORK ARCHITECTURE

(75) Inventors: Rajesh B. Khandelwal, Bridgewater, NJ (US); David A. Braun, Denville, NJ (US); Luyang Li, South Plainfield, NJ (US); Chieh-Chung Chang, Monmouth Junction, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/308,930

(22) Filed: Dec. 3, 2002

(65) Prior Publication Data

US 2004/0107451 A1 Jun. 3, 2004

(51) Int. Cl.
*H04N 7/16* (2006.01)
(52) U.S. Cl. ............................. 725/25; 725/28; 725/29; 725/132; 725/140
(58) Field of Classification Search ................ 725/9, 725/25, 28, 29, 132, 140; 380/232; 713/191
See application file for complete search history.

(56) References Cited

U.S. PATENT DOCUMENTS

| | | | | |
|---|---|---|---|---|
| 6,047,377 | A * | 4/2000 | Gong | 713/201 |
| 6,240,401 | B1 | 5/2001 | Oren et al. | |
| 6,249,809 | B1 | 6/2001 | Bro | |
| 6,256,393 | B1 * | 7/2001 | Safadi et al. | 380/232 |
| 6,286,139 | B1 * | 9/2001 | Decinque | 725/5 |
| 6,421,728 | B1 | 7/2002 | Mohammed et al. | |
| 6,425,133 | B1 | 7/2002 | Leary | |
| 6,487,723 | B1 * | 11/2002 | MacInnis | 725/132 |
| 6,665,869 | B1 * | 12/2003 | Ellis et al. | 725/39 |
| 6,745,245 | B1 * | 6/2004 | Carpenter | 709/229 |
| 6,948,183 | B1 * | 9/2005 | Peterka | 725/25 |
| 6,993,132 | B1 * | 1/2006 | Khandelwal et al. | 380/232 |
| 2002/0138554 | A1 * | 9/2002 | Feigen et al. | 709/203 |
| 2003/0009487 | A1 * | 1/2003 | Prabakaran et al. | 707/204 |
| 2003/0018445 | A1 * | 1/2003 | Vince et al. | 702/119 |

(Continued)

FOREIGN PATENT DOCUMENTS

EP 0982935 A2 2/2000

(Continued)

OTHER PUBLICATIONS

Thrift et al., "JTV Java-enabled Television", Proceedings of the SPIE, vol. 3228, Nov. 4, 1997.*

(Continued)

*Primary Examiner*—Scott Beliveau
(74) *Attorney, Agent, or Firm*—Harness, Dickey & Pierce, PLC

(57) ABSTRACT

A digital cable network architecture and services method includes a cable medium and a plurality of hosts that include a receiver. A policy file store contains policy files having at least one of a service provider section, a consumer section, and a manufacturer section that can be updated by at least one of the service provider, a consumer and a receiver manufacturer, respectively. A service provider that is associated with the policy file store provides digital cable services over the cable medium to the hosts and downloads monitor applications and policy files to the hosts over the cable medium. The MAs use the service provider section, the consumer section, and/or the manufacturer section of the policy file to alter resource contention, alter service provisioning at levels below a channel level, and/or alter fraudulent receiver identification calculations.

22 Claims, 15 Drawing Sheets

U.S. PATENT DOCUMENTS

2003/0163726 A1* 8/2003 Kidd .......................... 713/200
2003/0217369 A1* 11/2003 Heredia ...................... 725/152
2004/0111643 A1* 6/2004 Farmer ....................... 713/201

FOREIGN PATENT DOCUMENTS

| EP | 1261166 A2 | 11/2002 |
|----|-----------|---------|
| WO | WO 99/13641 | 3/1999 |
| WO | WO 9966714 A1 * | 12/1999 |
| WO | WO 00/50978 | 8/2000 |
| WO | WO 02/075476 A2 | 9/2002 |

OTHER PUBLICATIONS

"OpenCable Application Platform Specification", OCAP 2.0 Profile, OC-SP-OCAP2.0-101-020419, Apr. 19., 2002, pp. 1-22.

"OpenCableTM Application Platform Specification", OCAP 1.0 Profile, OC-SP-OCAP1.0-104-021028, pp. 1-412.

"OpenCableTM Host Device Core Funtional Requirements", OC-SP-HOST-CFR-110-020628, by Gary Logston, Jun. 28, 2002, pp. 1-48.

* cited by examiner

|  | STB₁ | | STB₂ | | STB₂ | |
| --- | --- | --- | --- | --- | --- | --- |
|  | MSO | Customer | MSO | Customer | MSO | Customer |
| Basic Channels | Always | Always | Always | 6A-8P | Always | 6A-8P |
| Premium 1 | Always | Always | Always | Never | Always | 6A-8P, and G, PG only |
| Premium 2 | Always | Always | Always | Never | Always | Never |
| Premium 3 | Always | Always | Always | 6A-8P | Always | 6A-8P and G, PG only |
| Games | Always | Always | Always | 5P-6P; No V | Always | 5P-8P |

FIG. 10

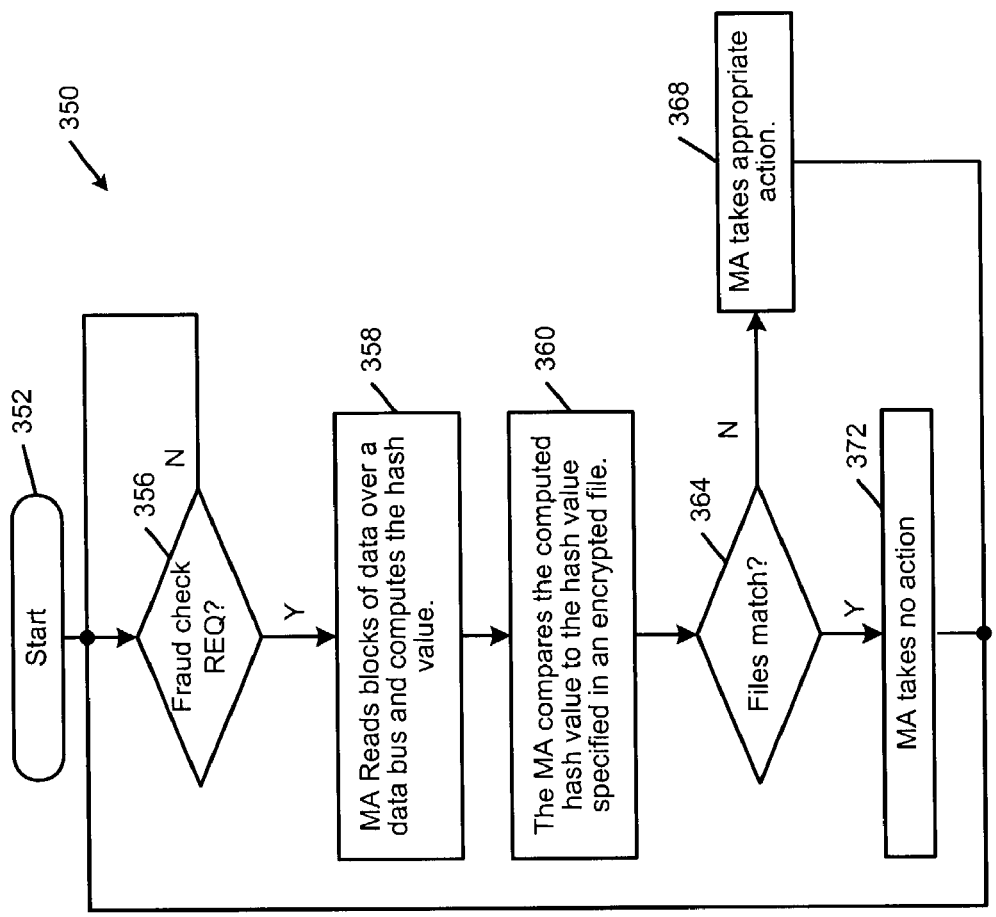
FIG. 11B
_Prior Art_
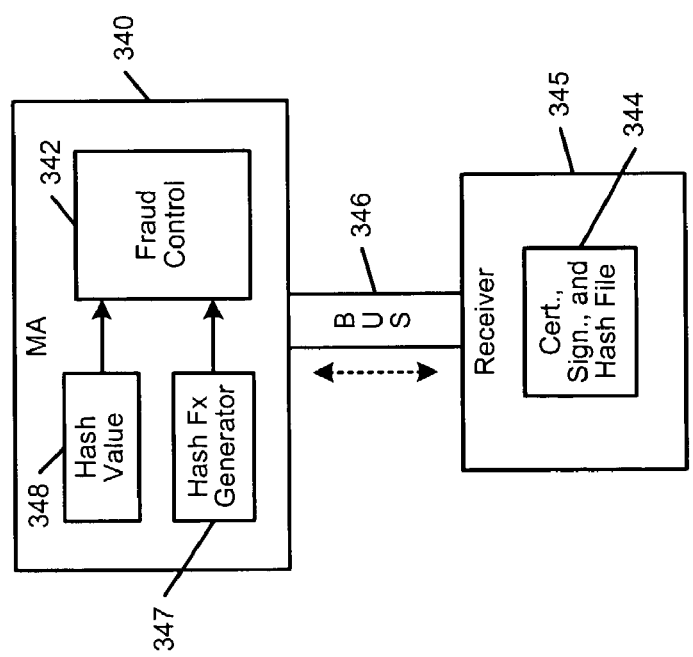
FIG. 11A
_Prior Art_

FLEXIBLE DIGITAL CABLE NETWORK ARCHITECTURE

FIELD OF THE INVENTION

The present invention relates to cable networks, and more particularly to a digital cable network architecture that provides improved flexibility for customers, service providers and/or manufacturers.

BACKGROUND OF THE INVENTION

Cable system operators charge monthly fees for various services. Cable systems can be implemented using analog and/or digital networks. The analog cable networks typically offer limited services such as basic channels and premium channels. In addition to basic services, the digital cable networks offer expanded services including one or more of the following: electronic program guides (EPGs), premium channels, impulse pay-per-view (IPPV), video-on-demand (VOD), interactive sports, game shows, web access and features such as e-mail, chat, and instant messaging, interactive games, and/or services such as shopping (television commerce, or "T-Commerce"), home banking, and personal video recorders (PVR).

Some customers may attempt to fraudulently obtain one or more of the cable services. To maintain revenues, service providers must be able to reduce fraudulent access. The ability to cut off and/or to identify the location of customers who have fraudulently obtained the cable services would help to reduce fraudulent access.

Service providers must also be able to provide service provisioning in a cost effective manner. In analog cable networks, service provisioning is an expensive process. Referring now to FIG. 1, an analog cable network 10 includes a cable service provider 14 that generates cable signals over cable 18. Cable drops 22-1, 22-2, . . . , and 22-$n$ provide the cable signals to cable boxes 26-1, 26-2, . . . , and 26-$n$ at customer locations. One or more analog filters 30 are added to each of the cable drops 22 at the customer locations to disable or filter out one or more premium channels if the customer is not a subscriber. When a subscription change is requested, the cable service provider 14 must dispatch a crew to the customer location. The crew adds or removes the filters 30, which remove or add, respectively, a premium channel. The cost of dispatching the crew must be included in the price of the premium channel, which increases the cost to the consumer.

OpenCable™ is a standard that has been defined by cable operators to provide digital cable-ready devices using a common platform. Referring now to FIG. 2, the Open-Cable™ standard defines a host 50, which is typically a set top box 50-1 or an integrated television 50-2. The set top box 50-1 is typically connected to a television or monitor 54. A POD module 58, which is removable from the host 50, provides security and user authentication. The POD module 58 contains functionality that is associated with a proprietary conditional access system of a local cable provider or multiple system operator (MSO) 60. The POD module 58 is provided by the MSO 60 and is typically implemented using a PCMCIA or PC card. The POD module 58 may communicate with the MSO 60 using an in-band channel 64-1 and/or an out of band (OOB) channel 64-2 over the cable 64.

One goal of OpenCable™ is to provide portability. A consumer who purchases the host 50 for one cable system can relocate to another cable system and use the same host 50. OpenCable™ also seeks to lower the cost of service provisioning and to reduce fraudulent access. The Open-Cable™ Applications Platform (OCAP™) specifications (OC-SP-OCAP1.0-I04-021028 and OC-SP-OCAP2.0-I01-020419) which are hereby incorporated by reference in their entirety, provides an open interface between the manufacturer's operating system (OS) and the various applications that will run within the host 50. Currently, developers of interactive television (iTV) applications must rewrite their programs for each proprietary platform. OCAP™ provides a standard application programming interface (API) to allow applications to be deployed on all hosts 50.

To allow portability, encryption and security are separated from the host 50 and are located in the POD module 58. When inserted into the host 50, the POD module 58 decodes encrypted content from the cable provider 60.

OpenCable™ provides channel-based service provisioning. When the consumer requests a premium channel or other resource, the POD module 58 sends a message to the cable provider 60. If the consumer subscribes to the premium channel or other resource, the cable provider 60 sends an entitlement message (EMM) back to the POD module 58. If the EMM is received, the host 50 is granted access. For premium channels, the granularity of control provided by OpenCable™ is at the level of a physical channel. In other words, the premium channel is either enabled or disabled.

OCAP™ also specifies a mechanism for detecting fraudulent and/or compromised receivers in hosts. A certificate, a signature file and hash files are embedded in the receiver of the host. The hash file enumerates a list of hash values for memory blocks in the receiver. A monitor application (MA) reads the blocks of data over a data bus and computes the hash value. The MA compares the computed hash value to the hash value specified in an encrypted file. The MA takes appropriate action such as terminating service and sending notification to the MSO when a mismatch occurs.

There are several disadvantages with the foregoing mechanism for preventing fraudulent receivers. First, the hash file is embedded in the receiver. The contents of the hash file cannot be easily changed without reprogramming the receiver. Secondly, the MA computes the same hash value every time. Hackers can monitor the host data bus for hash calculations. Over time, hackers will figure out the hash function since the computation would be very predictable. In addition, the API for the OCAP™ specification has been published, which includes API's for reading the contents of the flash memory. In summary, the entire firmware is exposed using this approach and the likelihood of fraudulent access is significantly increased.

Additionally, the OpenCable™ standards define a resource manager (RM) that manages system resources such as tuning, audio/video decodings, graphics plane and background devices. Once programmed, the RM manages resource contention based on predefined default rules that cannot be changed without reprogramming the host.

SUMMARY OF THE INVENTION

A digital cable network architecture and services method according to the invention includes a cable medium and a plurality of hosts that include a receiver. A policy file store contains policy files having at least one of a service provider section, a consumer section, and a manufacturer section that can be updated by at least one of the service provider, a consumer and a receiver manufacturer, respectively. A service provider that is associated with the policy file store provides digital cable services over the cable medium to the hosts and downloads monitor applications and policy files to the hosts over the cable medium. The MAs use the service provider section, the consumer section, and/or the manufacturer section of the policy file to alter resource contention, alter service provisioning at levels below a channel level, and/or alter fraudulent receiver identification calculations.

In other features, the service provider manages the MAs located on the hosts based on MA versions. The service provider includes a policy file manager that manages the policy files based on policy file versions. A resource manager manages host resources including at least one of tuning resources, audio/video decoding resources, graphics resources and backplane resources. When resource contention occurs, the resource manager communicates with the MA, which reads the service provider section for resource contention rules. The resource manager resolves the resource contention based on the resource contention rules.

In still other features, when the consumer requests access to a cable channel, the MA reads the consumer section of the policy file and makes an access decision based on the consumer section. The consumer section of the policy file allows access decisions to be based on at least one of channel identification, spending limits, time of day, and violence content.

In yet other features, a computer includes a web browser. A web server communicates over the distributed communications system with the web browser. A policy file manager communicates with the web server and the computer to allow the service provider, the consumer, and/or the receiver manufacturer to remotely edit the service provider section, the consumer section and the manufacturer section, respectively, of the policy file.

In still other features, the MA has access to at least one of privileged application programming interfaces (APIs) including application filtering, application upgrade, system reboot, resource conflict, event handling, error handling and system functions. An event manager communicates with the MA and that includes an event/application table. The MA overrides the event/application table to enforce the policy file.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 10 illustrates a service provisioning example;

FIG. 11A is a functional block diagram illustrating a fraudulent access identification system according to the prior art;

FIG. 11B illustrates a fraudulent access identification method according to the prior art;

DETAILED DESCRIPTION OF THE PREFERRED EMBODIMENTS

Figure 1:
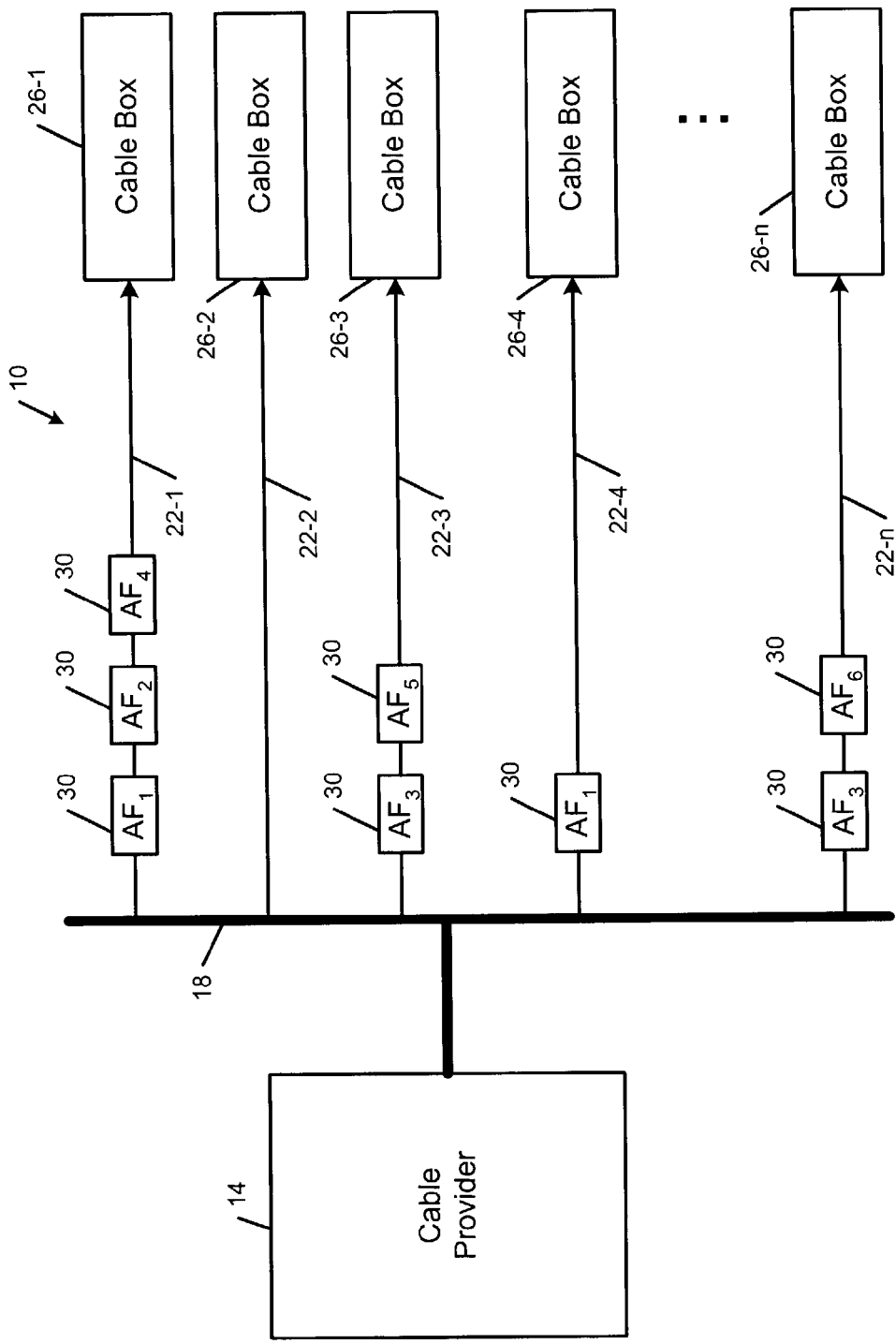
FIG. 1 is a functional block diagram illustrating service provisioning in an analog cable network according to the prior art.
Figure 2:
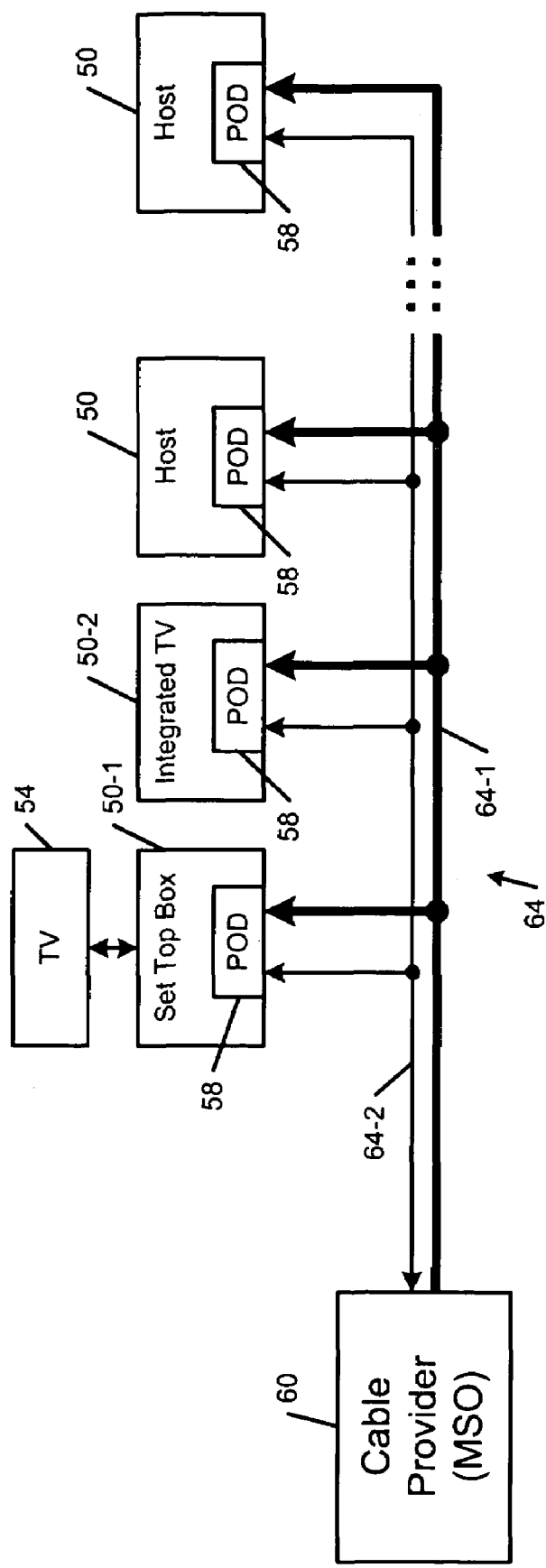
FIG. 2 is a functional block diagram illustrating service provisioning in a digital cable network according to the prior art.

The following description of the preferred embodiment(s) is merely exemplary in nature and is in no way intended to limit the invention, its application, or uses. For purposes of clarity, the same reference numbers will be used in the drawings to identify similar elements.

The present invention discloses an open architecture for digital cable services. A monitor application (MA) is periodically updated by the MSO. The MA accesses a policy file (PF) that includes customer, MSO and/or manufacturer sections. These sections can be changed by the customer, the MSO, and the manufacturer, respectively. The policy file allows the customer, the MSO and the manufacturer to customize their respective interfaces without requiring the host, the receiver, etc. to be reprogrammed.

For example, the customer can use the customer section of the PF to provide additional content, time and/or monetary control, such as time of operation, program content, gaming content, channels, dollars spent and other details, on levels below the channel level that is currently provided. For example, the MSO can use the MSO section of the PF to update resource contention defaults as situations, business relationships or other conditions dictate. For example, the manufacturer can use the manufacturer section of the PF to alter platform validation calculations over time to avoid fraudulent use by hackers.

Figure 3:
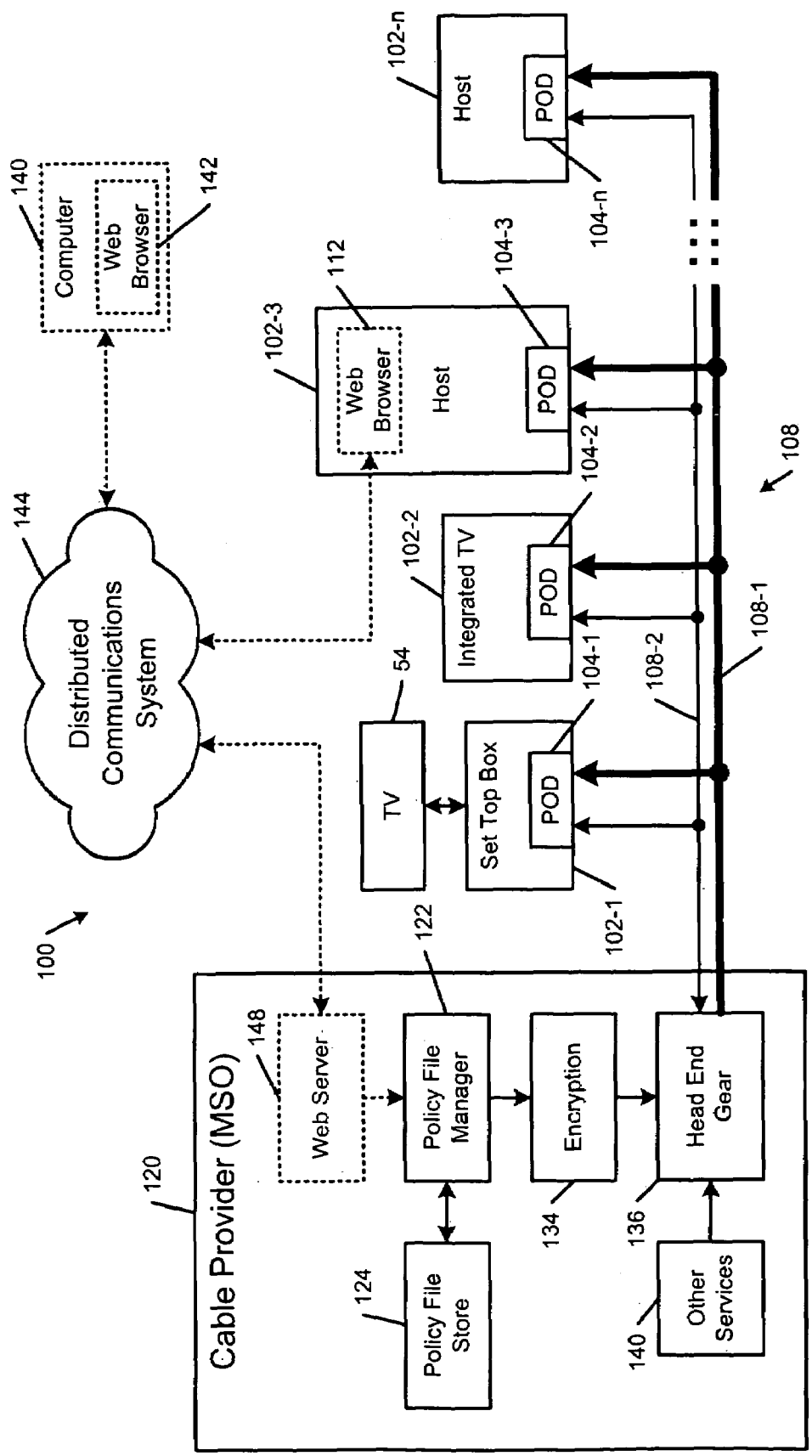
FIG. 3 is a functional block diagram illustrating service provisioning in a digital cable network according to the present invention.

Referring now to FIG. 3, a digital cable network 100 provides digital cable services to a plurality of hosts 102-1, 102-2, . . . , and 102-n. The hosts 102 can be set-top boxes, integrated TVs, or any other type of host. The hosts 102 include removable POD modules 104-1, 104-2, . . . , and 104-n, which handle security and encryption. The POD modules 104 connect the hosts 102 to the MSO by a cable medium 108 using in-band and out-of-band channels 108-1 and 108-2, respectively. The hosts 102 may optionally include a web browser 112.

The MSO 120 includes a policy file (PF) manager 122, that manages a PF data store 124 containing PFs for hosts in the digital cable network 100. Each PF preferably includes one or more sections. A first or customer section of the PF is for the customer. For example, the customer may use the customer section to provide service provisioning with additional granularity. An optional second section of the PF is for the MSO. For example, the MSO may use the MSO section to define resource permission settings for host applications and to resolve resource contention between host applications. An optional third section of the PF is for the manufacturer. The manufacturer section may be used to periodically modify fraud identification techniques. The sections of the PF can be modified for each host 102 by the respective section "owner". In other words, the manufacturer can modify the manufacturer section, the customer can modify the customer section, and the MSO can modify the MSO section.

The MSO, the customer, and/or the manufacturer may access the PF in several different ways. Computers 140 that include a web browser 142 can access the PF over a distributed communications system 144 such as the Internet. A web server 148 associated with the MSO interfaces with the PF manager 122 to change the PF. Hosts 102 with web browsers 112 may access the PF using a cable modem over the cable 108 and/or using other Internet access methods. When changes are made to the PFs stored in the PF manager 122, the MSO 120 pushes the PF to the corresponding host 102. Alternatively, the MSO 120 notifies the host 102 that a new PF version is available. The MSO preferably encrypts the PF using an encryption device 134 and sends the PF using head end gear 136. Other services 140 described above are also provided on the cable 108 through the head end gear 136.

Figure 4:
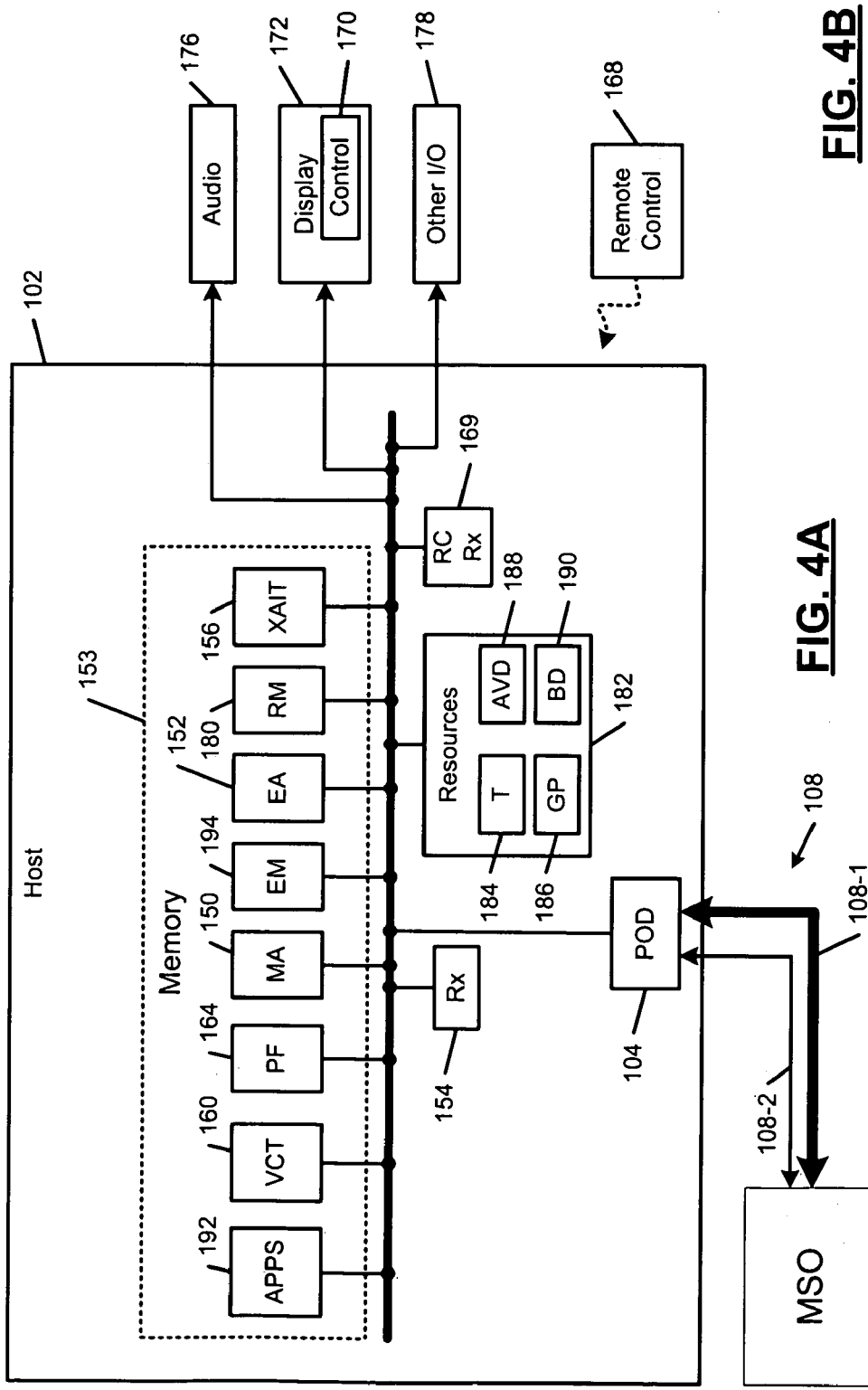
FIG. 4 is a functional block diagram of the host in FIG. 3 in further detail.

Referring now to FIG. 4A, the host 102 is shown in more detail. When initially connected to the digital cable network 100 and before receiving (or having) a resident MA (MA) 150, the host 102 is controlled by an executive application (EA) 152 stored in memory 153, which may include read only memory, FLASH memory or any other suitable electronic data storage.

A receiver 154 monitors an extended applications information table (XAIT) 156 in the memory 153. The MSO 120 notifies the receiver 154 of a current version of the MA 150 using the XAIT 156. The receiver 154 detects a mismatch between a current MA version (or no MA) and the current MA version in the XAIT 156. If a version mismatch occurs, the receiver 154 reads a virtual channel table (VCT) 160, which identifies a physical channel for receiving the MA 150. The receiver 154 tunes to the specified physical channel and receives the MA 150. The MSO 120 broadcasts the MA 150 in a continuous loop, at predetermined times, or in any other suitable fashion on the specified channel. After receiving the MA 150 and storing the MA in FLASH, the host 102 begins operating using the MA 150.

The MSO 120 may push a PF to the host 102 when the MA is downloaded. Alternately, the MA 120 may include a routine to automatically download a current PF when a new MA or new MA version is downloaded and stored in FLASH. The MSO 120 also automatically downloads the PF to the host 102 whenever changes are made to the PF. The MSO 120 preferably encrypts the PF using the encryption device 134 before transmission. The MA 150 decrypts the PF and stores the PF (as shown at 164) in the memory 153.

The MSO 120 may optionally notify the receiver 154 of a current version of the PF using the XAIT 156. When the receiver 154 detects a mismatch between a current version of the PF 164 (or no PF) and the current PF version in the XAIT 156, the receiver 154 contacts the MSO 120 and requests the newer PF version. The MSO 120 sends the newer PF version to the MA 150, which decrypts the PF and begins operating with the newer PF version. Alternately, when changes to the PF are made by the manufacturer, the MSO and/or the consumer, the MSO 120 can automatically download the new PF to the MA 150.

A customer may select a cable channel, games or other content using a remote control (RC) 168 (which generates a signal that is received by RC receiver 169). The customer may also select a cable channel, games or other content using a panel control 170 on a display 172, the set top box 102-1, or the integrated TV 102-2. The customer may also adjust audio outputs 176 and interface with other input/output devices 178 using the same or other controls.

A resource manager 180 manages host resources 182 such as a tuner 184, a graphics plane 186, an audio/video decoder 188, background devices 190 and any other resources. The resource manager 180 manages contention for the resources 182 by applications 192 such as the electronic program guide (EPG), premium channels, impulse pay-per-view (IPPV), video-on-demand (VOD), interactive sports, game shows, web access and features such as e-mail, chat, and instant messaging, interactive games, and/or services such as shopping (television commerce, or "T-Commerce"), home banking, and personal video recorders (PVR). An event manager (EM) 194 handles events using one or more tables, as will be described further below. In FIG. 4B, the PF 164 may include an MSO section 196, a manufacturer section 198, a customer section 199, and/or other sections.

Figure 5:
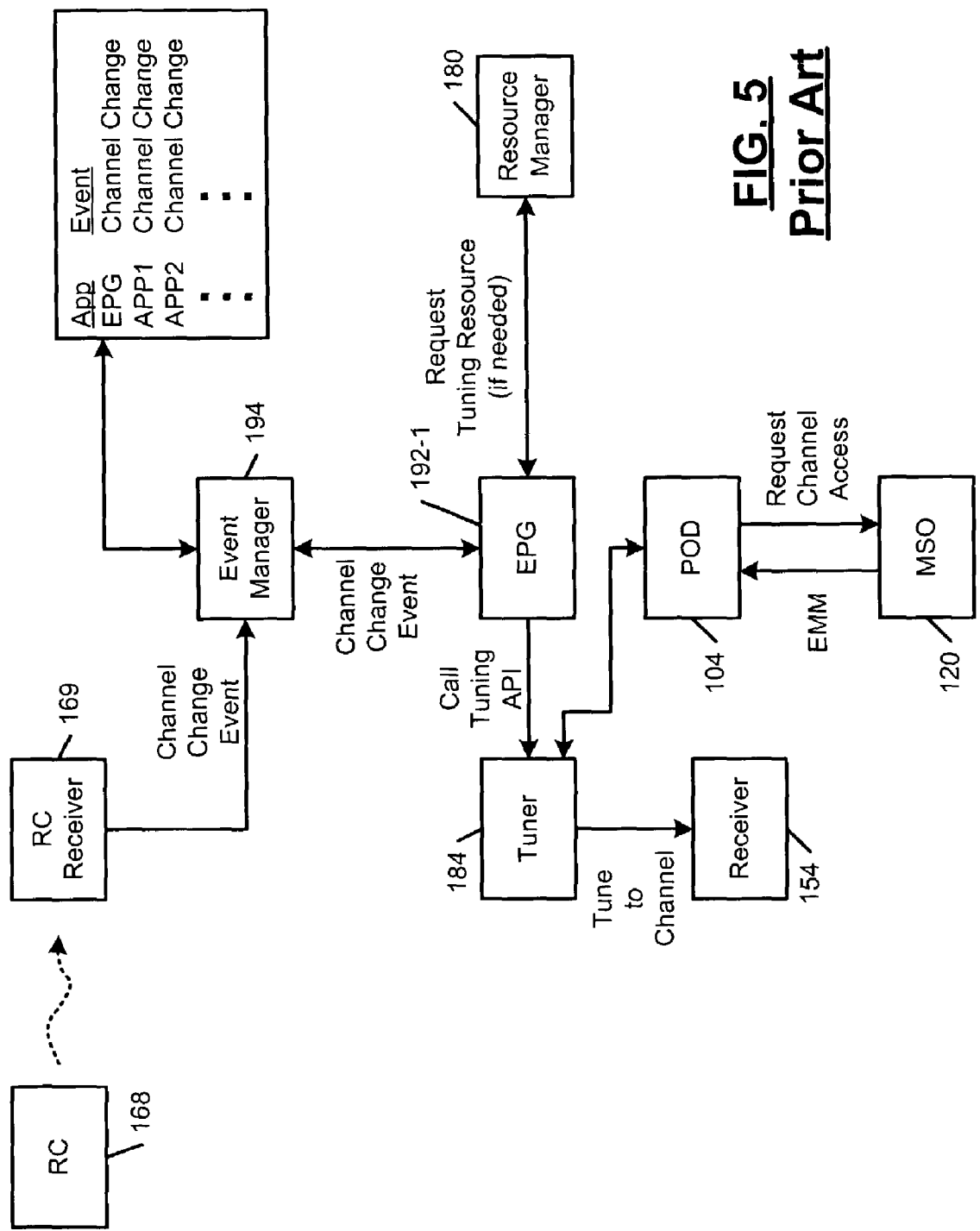
FIG. 5 is a functional block diagram illustrating an example of service provisioning in accordance with the prior art.

Referring now to FIG. 5, an example illustrating service provisioning according to the prior art is shown. The RC 168 sends a change channel request, which is received by the RC receiver 169. The change channel request is transmitted over the data bus to the event manager 194. The event manager 194 includes a table of applications, such as the EPG 192-1, APP1 and APP2, that have registered for the change channel event. The event manager 194 transmits the change channel event to the EPG 192-1, APP1 and APP2.

The EPG 192-1 requests the tuner 184 if needed from the RM 180. If the EPG 192-1 already has the tuner 184 resource, the EPG 192-1 calls the tuning API. Before the POD decodes the channel that is tuned, the POD 104 (which listens for tuning APIs) sends a request_channel_access message for the appropriate channel to the MSO 120. If approved, the MSO 120 sends the EMM back to the POD 104, which decodes the channel. If the EMM is not received, the channel is tuned but is not decoded. As was described above, this service provisioning method provides access on a channel level only.

Figure 6:
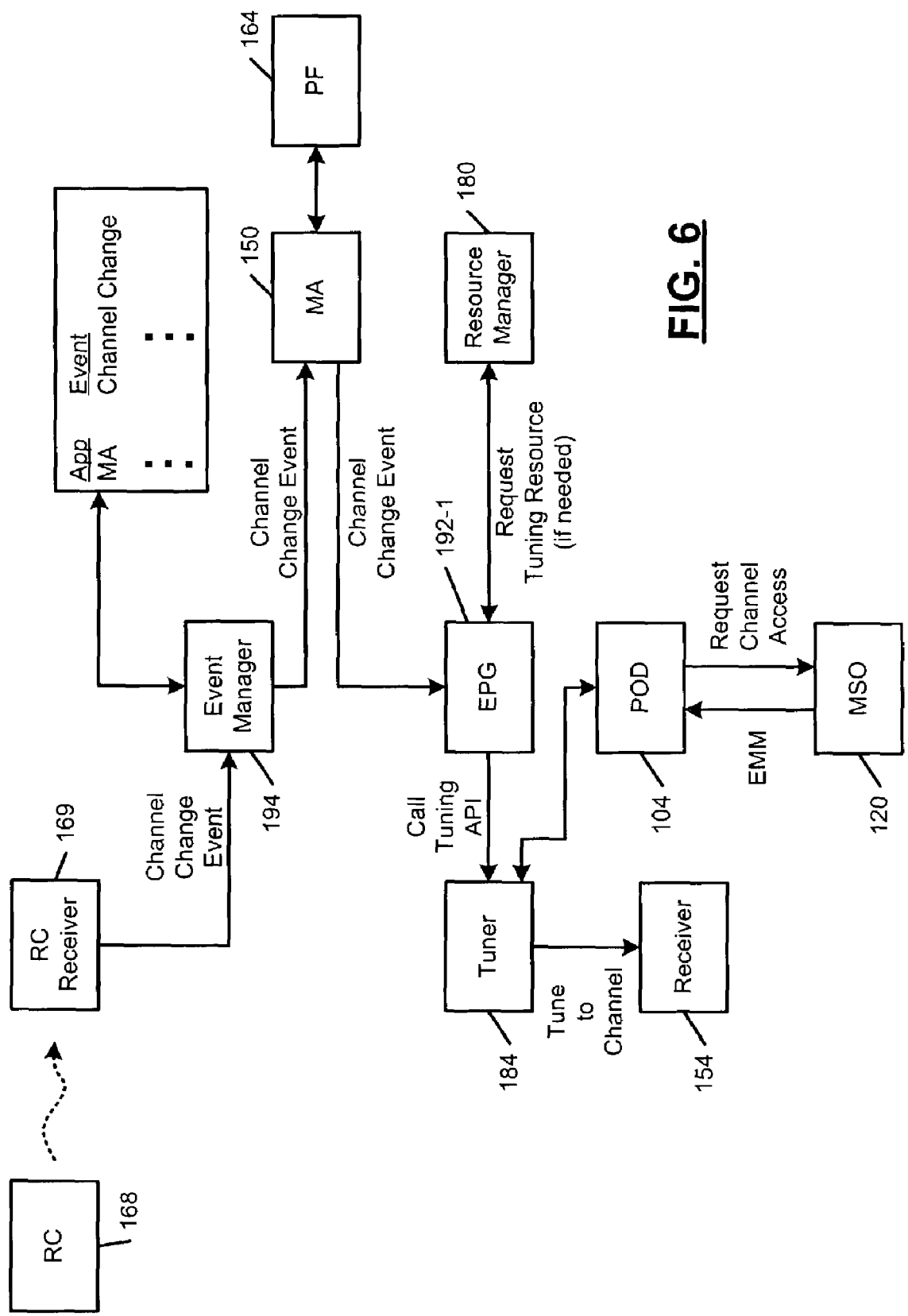
FIG. 6 is a functional block diagram illustrating service provisioning using a policy file (PF) and a monitor application (MA) according to the present invention.

Referring now to FIG. 6, an example illustrating service provisioning according to the present invention is shown. The MA 150 consults the PF 164 before granting access to the channel 182. The MA 150 has access to privileged API's such as application filtering and upgrade, system reboot, resource conflict, event handling, error handling and system functions. In a preferred embodiment, the PF is XML-based program and is downloaded via the POD OOB connection into FLASH memory. The MA is Java-based. While XML and Java are disclosed, any other suitable languages can be used.

The MA 150 is an unbound application with privileges. The MA 150 manages the life cycle of all OCAP™ applications, including itself. The MA 150 provides resource contention, registers unbound applications with an applications database, validates the starting all applications, identifies system errors, and reboots the system. The MA 150 can change copy protection bits and output resolution using OCAP™ interfaces. The MA 150 may also filter user input events and change their value before sending them to their final destination. Therefore, the MA 150 can enable and disable keys on the RC 168 or other controls 170, which will enable and disable functions.

In FIG. 6, the RC 168 sends a change channel request, which is received by the RC receiver 169. The change channel request is transmitted over the bus to the event manager 194. The event manager 194 includes a table of applications that have registered for the change channel event. The MA 150 can override the APP/Event table in the event manager 194. While the table shown in FIG. 6 shows the table including MA 150 for the channel change event instead of EPG, APP1 and APP2, the table need not be overwritten as shown. The MA 150 may simply override the current values in the table or otherwise disable the EM for these events and applications.

The event manager 194 transmits the change channel event to the MA 150. The MA 150 consults the PF 164. If the PF 164 allows the customer to select the channel (and/or other content and/or other resource), the MA forwards the channel change event to the EPG 192-1. Alternatively, the MA can instruct the EM to forward the change channel event directly to the EPG 192-1. Operation continues as described above with respect to FIG. 5.

Figure 7:
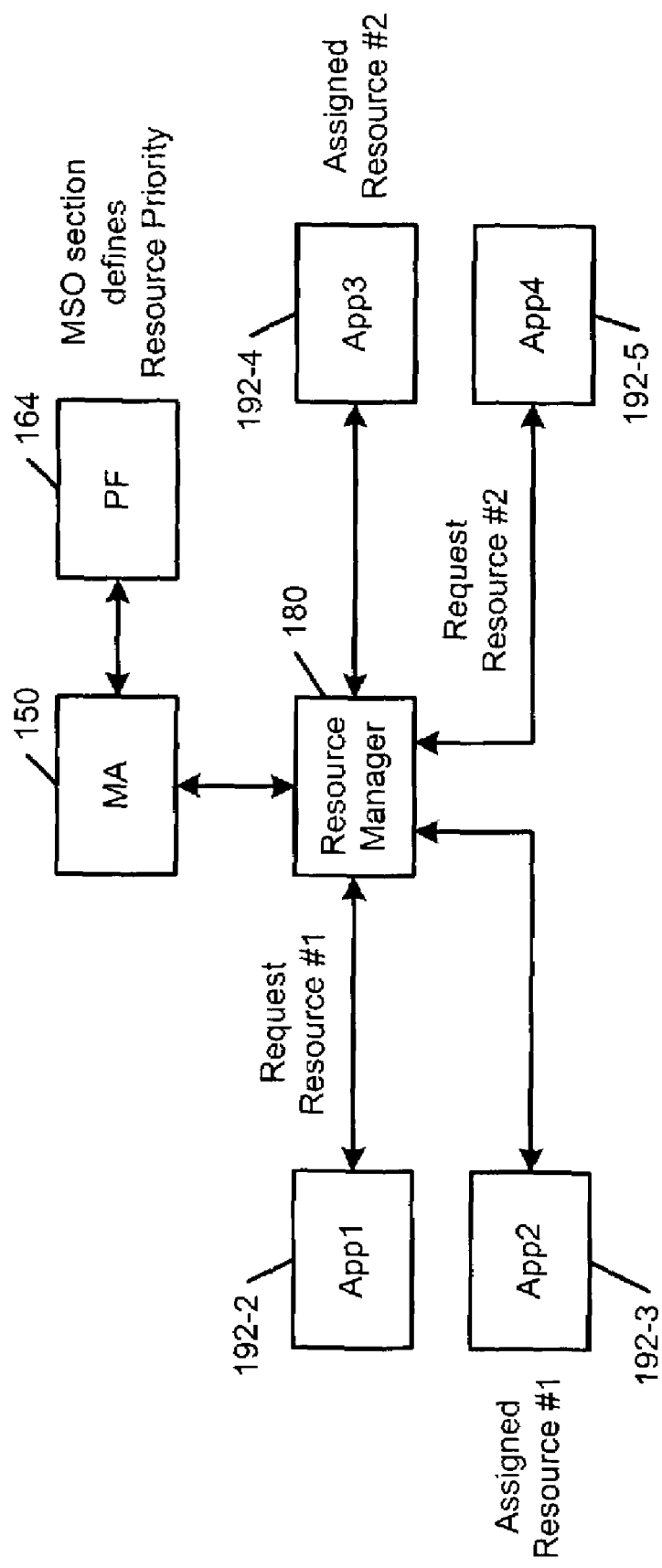
FIG. 7 is a functional block diagram of resource contention resolution using the PF and the MA according to the present invention.

Referring now to FIG. 7, with reference to FIG. 4A, the present invention also allows resource access to be controlled by the MA 150 and PF 164. Before granting access to a resource, the MA 150 checks the PF 164. If the PF 164 allows the application 192 access to the resource, the MA 176 sends an access_approved signal back to the RM 180. Otherwise, the MA 150 sends an access_denial signal to the RM 180.

The MA 150 also resolves resource contention based on the PF 164. The application 192-3 may currently have a resource such as the tuner 184, the graphics plane 186, the audio/video decoder 188, the background devices 190 and/or any other resource. The application 192-2 may request the resource(s) that are currently being used by the application 192-3. The application 192-4 may currently have a resource such as the tuner 184, the graphics plane 186, the audio/video decoder 188, the background devices 190 and/or any other resource. The application 192-5 may request the resource(s) that are currently being used by the application 192-4. The MA 150 and the PF 164 resolve the conflicts.

The MA 150 and the PF 164 may resolve the resource contention based on business relationships. In other words, the MSO 120 may define the MSO section 196 of the PF 164 to resolve resource contention in favor of a business partner. For example, when a first application requests a resource to tune to a particular channel such as Speed™ and another application such as the browser requests the tuner for another reason (and/or already has the resource), the first application will receive the resource.

Figure 8:
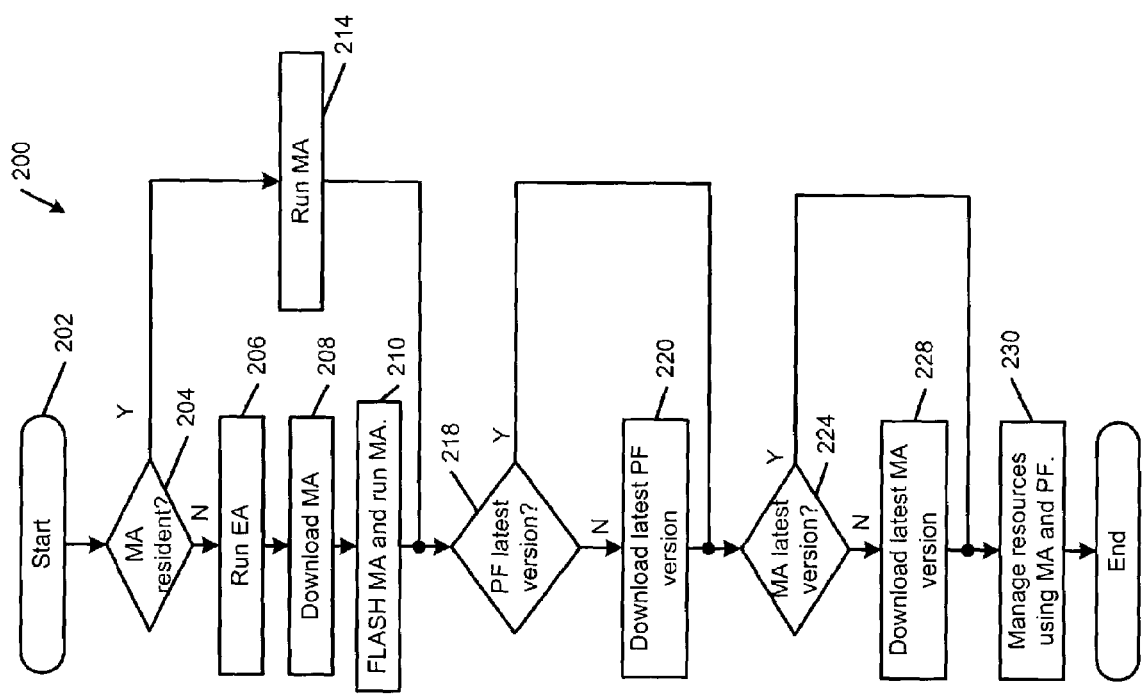
FIG. 8 is a flowchart illustrating steps for updating the MA and the PF according to the present invention.

Referring now to FIG. 8, exemplary methods for downloading MAs and PFs are shown generally at 200. Control begins with step 202. In step 204, control determines whether the host includes a resident MA. If not, control runs the executive application (EA) in step 206. In step 208, control checks the XAIT and VCT and downloads the MA from the MSO on the designated channel. Step 208 may be performed by having the host send the MSO a need_MA message. The MSO responds to the need_MA message by sending the MA. The host stores the MA in memory and then loads the MA into FLASH memory in step 210. If the MA is already resident, control runs the MA in step 214.

In step 218, the host may determine whether the PF is the latest version. If a version match does not occur, the host takes steps to download the PF in step 220. Step 220 may be performed by having the host send the MSO a need_latest_PF message. The MSO responds to the need_latest_PF message by sending the latest PF version. The host stores the PF in memory and loads the PF into flash memory. Alternatively, the MSO may automatically send the PF when changes to the PF occur.

Control continues with step 224 where the host determines whether the MA is the latest version (typically using the XAIT). If the MA is not the latest version, the host tunes to the channel identified in the VCT and downloads the latest MA version in step 228. Steps 224 and 228 may be performed in a manner that is similar to steps 218 and 220 described above. The host manages resources using the MA and PF in step 230.

Figure 9A:
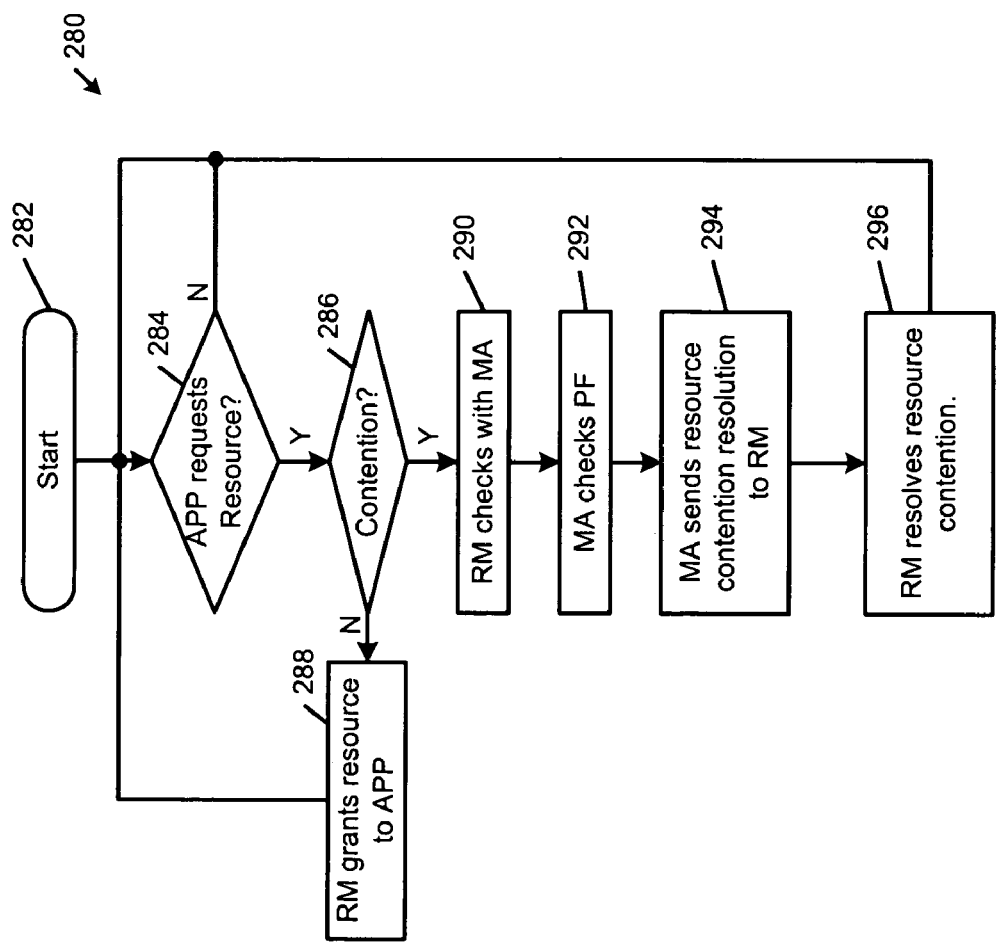
FIGS. 9A and 9B are flowcharts illustrating steps for resource contention resolution according to the present invention.

Referring now to FIG. 9A, steps of a method for managing resource contention using the PF 164 is shown generally at 280. Control begins with step 282. In step 284, control determines whether an application (APP) has requested a resource. If not, control loops back to step 284. If the APP requests a resource, control continues with step 286 where the RM determines whether there is contention for the resource. If not, the RM grants the application the resource in step 288 and continues with step 284. Otherwise, the RM sends a message to the MA in step 290. The MA, in turn, leads the PF to determine whether the resource contention is resolved by the PF in step 292. For example, the MSO section of the PF may resolve the contention based on business relationship criteria.

In step 294, the MA sends the resource contention resolution to the RM. The MA may resolve the contention and/or send a not_covered message if the PF does not address the contention. In the not_covered case, the RM may resolve the resource contention using a default rule. In step 296, the RM resolves the contention.

Figure 9B:
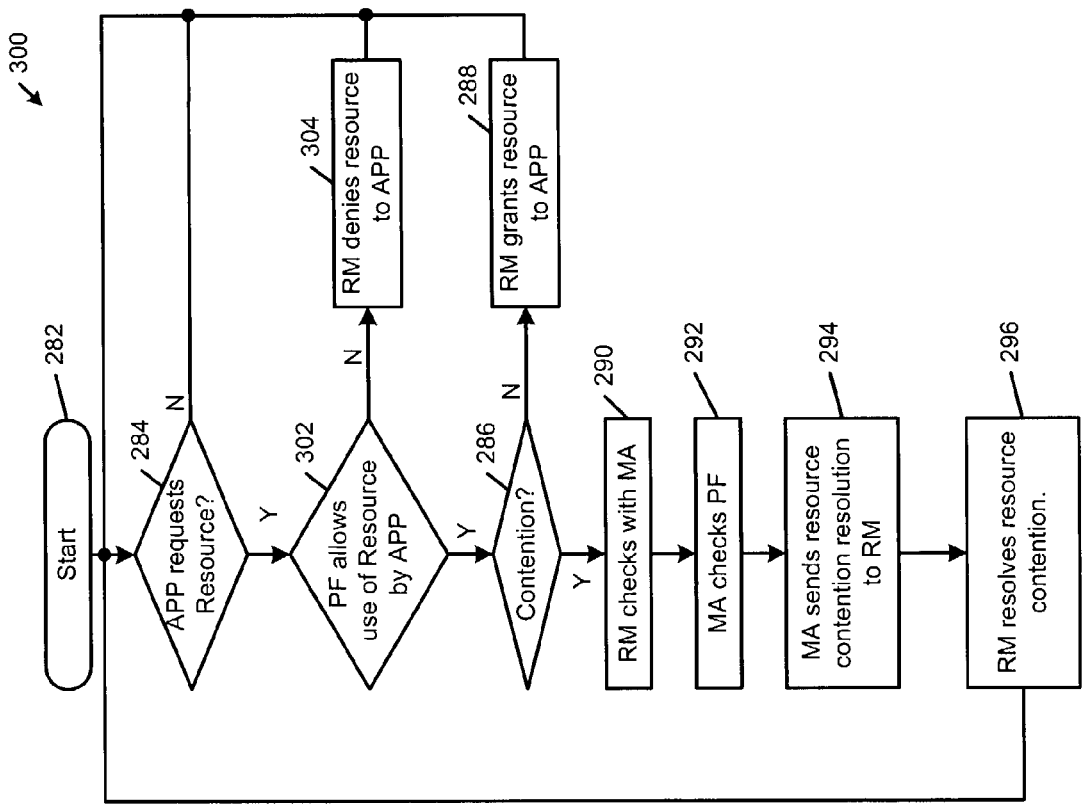

Referring now to FIG. 9B, the RM also checks with the PF before granting access to a resource even when there is no contention, shown generally at 300. In step 302, the RM checks with the MA (which checks with the PF) to determine whether the PF allows the application to use the resource. If not, the RM denies the resource to the application in step 304.

The PF and MA according to the present invention allow finer control over service provisioning and improved resource contention in the digital cable network 100 of FIG. 3. The PF and MA allow service provisioning with finer granularity than the channel level provided by the OCAP™ specification.

Referring now to FIG. 10, an example implementation is shown. A single consumer residence includes $STB_1$, $STB_2$ and $STB_3$. $STB_1$ is located in a controlled environments such as the parents bedroom. $STB_2$ is located in one child's bedroom. $STB_3$ is located in another child's bedroom.

Service provisioning according to the present invention allows control beyond the channel level. In particular, $STB_1$ is granted full access to basic channels, three premium channels and games all at times by the MSO and customer PF. $STB_2$ and $STB_3$ are granted full access to all basic channels three premium channels and games at all times by the MSO as well. However, the customer PF limits access of $STB_2$ to basic channels during certain times, to some premium channels during certain times, and to other premium channels during certain times and for games with no violent content. The customer PF limits access of $STB_3$ to basic channels during certain times, to some premium channels during certain times at certain ratings levels, and to all games during certain times. The customer may also define spending limits for total services and/or individual services.

As can be appreciated by the foregoing, the digital cable system according to the present invention offers finer granularity of control. The digital cable system allows the creation of tiers of service. The MA can be used to collect usage statistics, which can be used by the consumer for service provisioning. For example, the consumer can set spending limits for pay-per-view or gaming services and/or total time watched from anywhere on the Internet. Program ratings levels can also be controlled by the consumer.

In addition, the MSO can remotely disable or reboot the host. For example, the MSO can disable or reboot the host when the customer as an unpaid bill, the policy file has been compromised, the host is under some kind of intrusion, or the MSO does not receive the heartbeat of the MA. In addition, when a consumer has multiple hosts, billing detail can be defined for each host.

Referring now to FIG. 11A, a MA 340 according to the prior art includes a fraud control module 342 that includes a hash function generator and that stores a hash value. The MA 340 reads a certificate, signature and hash file 344 that is embedded in a receiver 345 over a data bus 346. The hash file 344 enumerates a list of hash values for blocks of information within the receiver 345. A hash function generator 347 of the MA 340 reads blocks of data over the data bus 346 and computes the hash value. The fraud control module 342 compares the computed hash value to a hash value 348 in an encrypted file. The MA 340 takes appropriate action such as terminating service and sending notification to the MSO when a mismatch occurs.

Referring now to FIG. 11B, a fraudulent access identification method according to the prior art is shown at 350. Control begins in step 352. In step 356, control waits for a fraud_check request to be made by the MA, the MSO or the manufacturer and/or the fraud_check request may be time based or event based. If the fraud_check request is received, the MA reads blocks of data over the data bus and computes the hash value in step 358. In step 360, the MA compares the computed hash value with the hash value stored in an encrypted file. In step 364, control determines whether there is a match. If not, in step 368 the MA takes appropriate action such as but not limited to terminating service, contacting the MSO, or any other suitable action. Otherwise, the MA takes no action in step 372.

As can be appreciated, by sending data over the exposed data bus 346 and by repeatedly computing the same hash function in the MA 340, the conventional system has an increased probability of being fraudulently accessed by hackers.

Figure 12B:
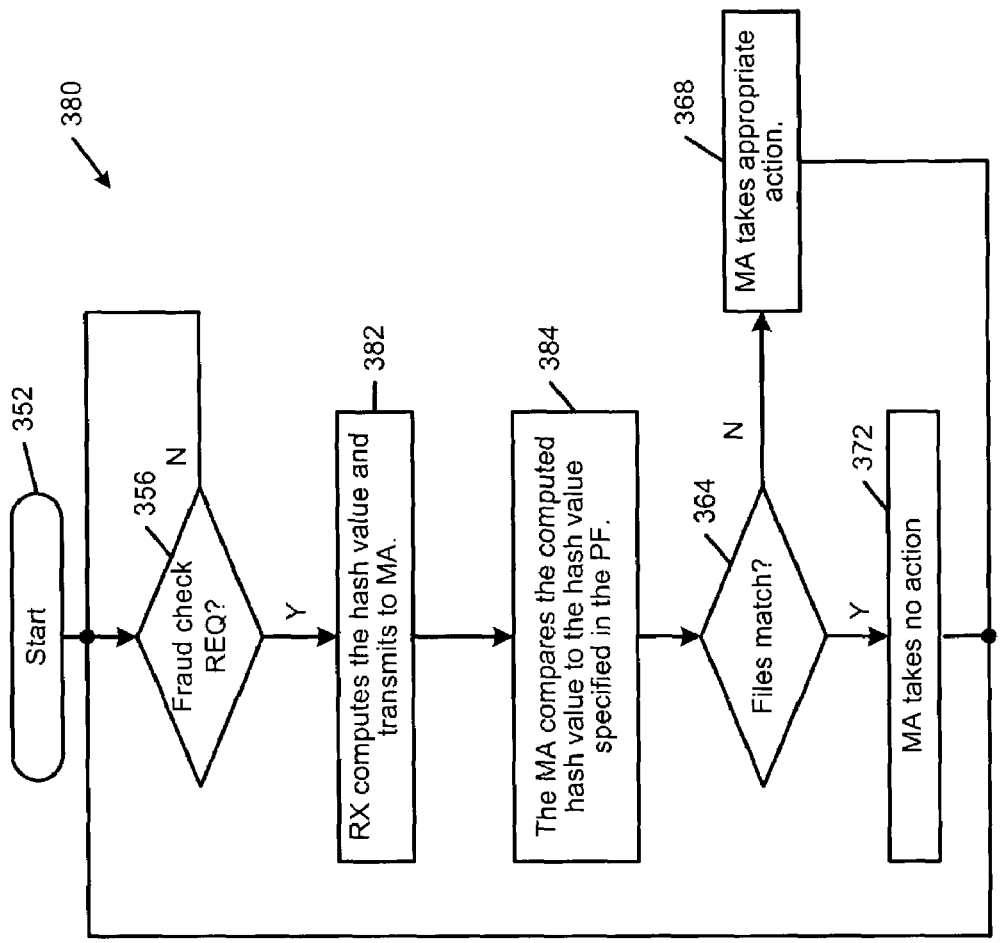
FIG. 12B illustrates a first fraudulent access identification method according to the present invention.
Figure 12A:
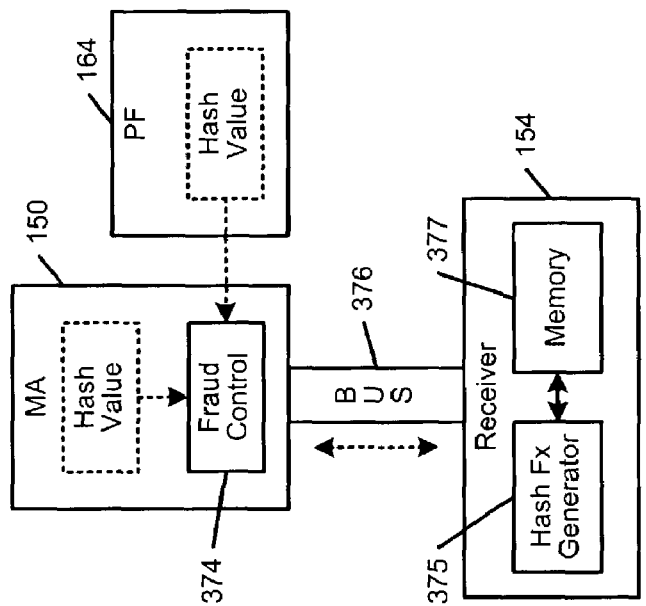
FIG. 12A is a functional block diagram illustrating a first fraudulent access identification system according to the present invention.

Referring now to FIG. 12A, the MA 150 includes a fraud control module 374 that generates a fraud request. The receiver 154 includes a hash function generator 375 that generates hash values using one or more hash functions. The memory blocks that are used by the hash function generator 375 may also be varied. The hash function generator 375 receives the hash function request over the data bus 376. The hash function generator 375 generates the hash function using memory blocks in memory 377. The hash function generator 375 generates a hash value that is transmitted to the fraud control module 374. The fraud control module 374 in the MA 150 compares the generated hash value with a hash value that is stored in encrypted form in either the MA 150 or the PF 164. The hash value may be stored in the manufacturers section of the PF 164.

Referring now to FIG. 12B, a fraudulent access identification method according to the present invention is shown at 380. Control begins in step 352. In step 356, control waits for a fraud_check request to be made by the MA, the MSO or the manufacturer and/or the fraud_check request may be time based or event based. If the fraud_check request is received, the MA sends a message to the receiver to compute the hash value and transmit the resulting hash value to the MA in step 382. In step 384, the MA compares the computed hash value with the hash value stored in an encrypted file and/or in the PF. In step 364, control determines whether there is a match. If not, the MA in step 368 takes appropriate action such as but not limited to terminating service, contacting the MSO, or any other suitable action. Otherwise, the MA takes no action in step 372.

As can be appreciated, by reducing data transmission over the exposed data bus 376 and shielding the hash function computation in the receiver, the fraudulent access identification system according to the present invention has a reduced probability of being fraudulently accessed by hackers.

Figure 13A:
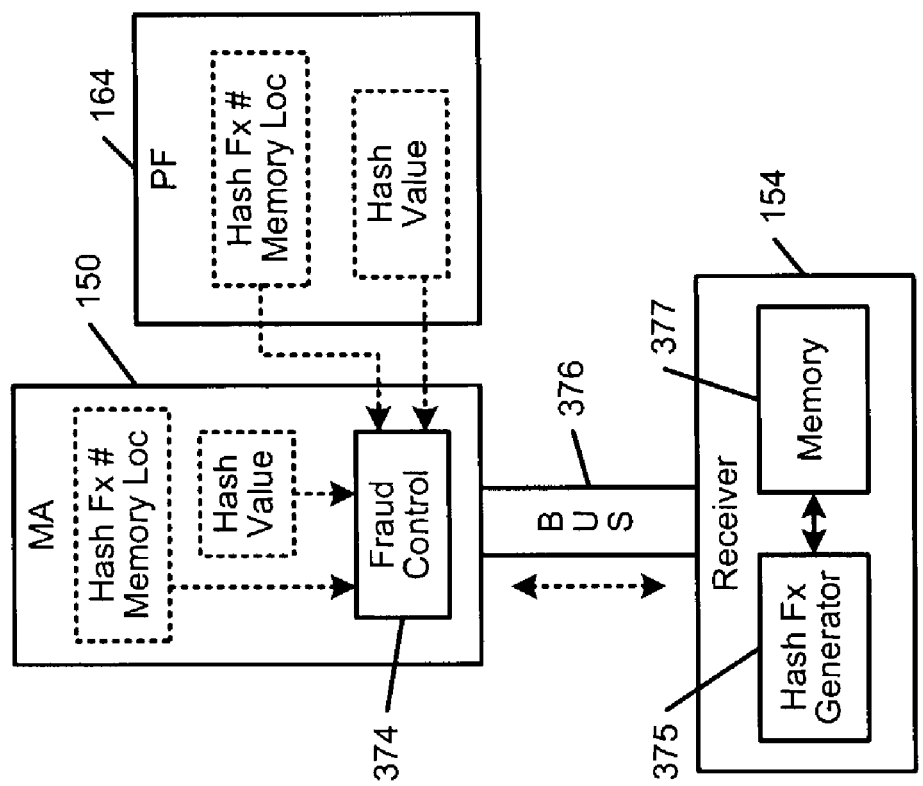
FIG. 13A is a functional block diagram illustrating a second fraudulent access identification system according to the present invention.

Referring now to FIG. 13A, the MA 150 includes the fraud control module 374 that generates the fraud request. The receiver 154 includes the hash function generator 375 that generates multiple different hash functions. The hash function generator 375 receives the hash function request over the data bus 376.

The MA sends a hash function selector identifying one of a plurality of hash functions implemented in the receiver and/or a data selector for selecting the memory blocks to use. The hash function selector and data selector can be randomly selected from the possible hash functions and data blocks. The hash function generator 375 generates the hash function using the selected hash function and selected memory blocks in memory 377. The hash function generator 375 generates the hash value that is transmitted to the fraud control module 374. The fraud control module 374 in the MA 150 compares the generated hash value with the hash value that is stored and that corresponds to the hash value selector and data selector that is used. The hash value, the hash function identification and/or memory blocks may be stored in the MA 150, the PF 164 and/or in the manufacturers section of the PF 164.

Figure 13B:
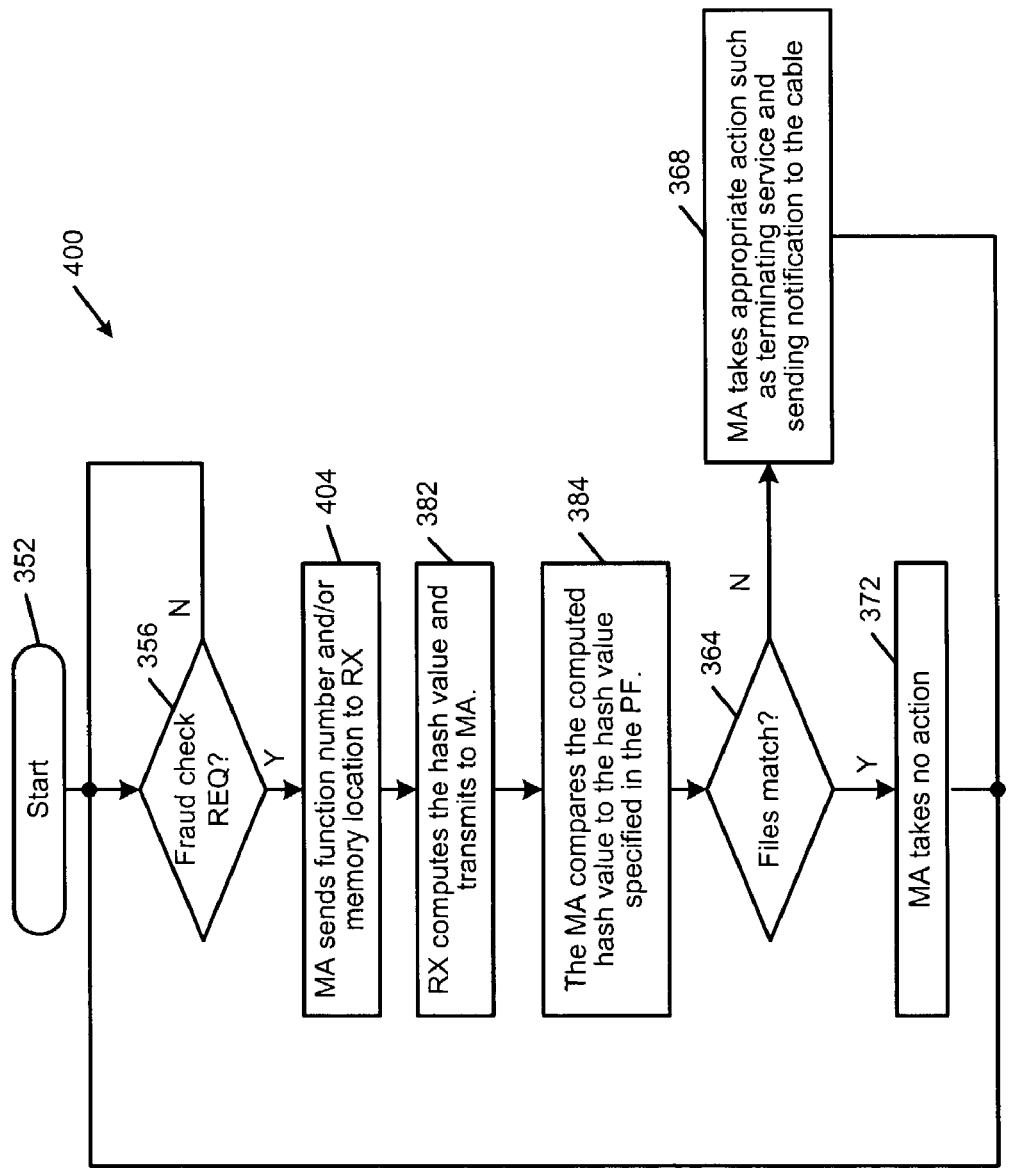
FIG. 13B illustrates a second fraudulent access identification method according to the present invention.

Referring now to FIG. 13B, a fraudulent access identification method according to the present invention is shown at 400. Control begins in step 352. In step 356, control waits for a fraud_check request to be made by the MA, the MSO or the manufacturer and/or the fraud_check request may be time based or event based. In step 404, the MA identifies the hash function to be used in the hash function selector and/or the memory blocks in the data selector 154.

If the fraud_check request is received, the MA sends a message to the receiver to compute the hash value and transmit the resulting hash value to the MA in step 382. In step 384, the MA compares the computed hash value with the hash value stored in an encrypted file or in the PF. In step 364, control determines whether there is a match. If not, the MA in step 368 takes appropriate action such as but not limited to terminating service, contacting the MSO, or any other suitable action. Otherwise, the MA takes no action in step 372.

As can be appreciated, increasing the number of hash functions and changing the memory block numbers will increase the complexity of the hash value calculation and reduce the likelihood of fraudulent access.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A digital cable network architecture, comprising:
   a cable medium;
   a plurality of hosts that include a receiver;
   a policy file store that contains policy files having a service provider section, a consumer section, and a manufacturer section that can be updated by at least one of said service provider, a consumer and a receiver manufacturer, respectively; and
   a service provider that is associated with said policy file store, that provides digital cable services over said cable medium to said hosts and that downloads monitor applications (MAs) and policy files to said hosts over said cable medium,
   wherein said hosts execute said MAs, wherein said MAs use said manufacturer section of said policy file to alter fraudulent receiver identification calculations, and use at least one of said service provider section to alter service provisioning at levels below a channel level, and said consumer section to alter resource contention and alter service provisioning at levels below a channel.

2. The digital cable network architecture of claim 1 wherein said service provider manages said MAs located on said hosts based on MA versions.

3. The digital cable network architecture of claim 1 wherein said service provider includes a policy file manager that manages said policy files based on policy file versions.

4. The digital cable network architecture of claim 1 further comprising a resource manager that manages host resources including at least one of tuning resources, audio/video decoding resources, graphics resources and backplane resources.

5. The digital cable network architecture of claim 4 wherein when resource contention occurs, said resource manager communicates with said MA, which reads said service provider section for resource contention rules and wherein said resource manager resolves said resource contention based on said resource contention rules.

6. The digital cable network architecture of claim 1 wherein when said consumer requests access to a cable channel, said MA reads said consumer section of said policy file and makes an access decision based on said consumer section.

7. The digital cable network architecture of claim 6 wherein said consumer section of said policy file allows access decisions to be based on at least one of channel identification, spending limits, time of day, and violence content.

8. The digital cable network architecture of claim 1 further comprising:
   a computer including a web browser;
   a distributed communications system;
   a web server that communicates over said distributed communications system with said web browser;
   a policy file manager that communicates with said web server and said computer to allow said at least one of said service provider, said consumer, and said receiver manufacturer to remotely edit said service provider section, said consumer section and said manufacturer section, respectively, of said policy file.

9. The digital cable network architecture of claim 1 wherein said MA has access to at least one of privileged application programming interfaces (APIs) including application filtering, application upgrade, system reboot, resource conflict, event handling, error handling and system functions.

10. The digital cable network architecture of claim 1 further comprising an event manager that communicates with said MA and that includes an event/application table, wherein said MA overrides said event/application table to enforce said policy file.

11. A method for providing digital cable services, comprising:
    connecting a plurality of hosts that include a receiver to a service provider;
    storing policy files having a service provider section, a consumer section, and a manufacturer section in a policy file data store that is associated with said service provider;
    allowing at least one of said service provider, a consumer and a receiver manufacturer to alter at least one of said service provider section, said consumer section, and said manufacturer section, respectively, of said policy files;
    downloading said policy files to said hosts when changes are made; and
    using said manufacturer section of said policy file to alter fraudulent receiver identification calculations, and use at least one of said service provider section to alter service provisioning at levels below a channel level, and said consumer section to alter resource contention.

12. The method of claim 11 further comprising managing downloading of said policy files stored on said hosts based on policy file versions.

13. The method of claim 11 further comprising managing resources including at least one of tuning resources, audio/video decoding resources, graphics resources and backplane resources.

14. The method of claim 13 further comprising:
    reading said service provider section of said policy file for resource contention rules when resource contention occurs; and
    resolving said resource contention based on said resource contention rules.

15. The method of claim 11 further comprising:
    reading said consumer section of said policy file when said consumer requests access to a cable channel; and
    making an access decision based on said consumer section.

16. The method of claim 15 wherein said consumer section of said policy file allows access decisions to be based on at least one of channel identification, spending limits, time of day, and violence content.

17. The method of claim 11 further comprising allowing said at least one of said service provider, said consumer, and said receiver manufacturer remote access to said service provider section, said consumer section and said manufacturer section, respectively, of said policy file.

18. The method of claim 11 further comprising:
    providing an event manager that includes an event/application notification table; and
    overriding said event/application notification table to enforce said policy file.

19. A digital cable network architecture, comprising:
a cable medium;
a plurality of hosts that include a receiver;
a policy file store that contains policy files having a service provider section, a consumer section, and a manufacturer section that can be updated by at least one of said service provider, a consumer and a receiver manufacturer, respectively;
a service provider that is associated with said policy file store, that provides digital cable services over said cable medium to said hosts and that downloads monitor applications (MAs) and policy files to said hosts over said cable medium, wherein said hosts execute said MAs and said MAs use at least one of said service provider section, said consumer section, and said manufacturer section of said policy file to alter fraudulent receiver identification calculations and at least one of alter resource contention and alter service provisioning at levels below a channel level; and
a resource manager that manages host resources including at least one of tuning resources, audio/video decoding resources, graphics resources and backplane resources, wherein when resource contention occurs, said resource manager communicates with at least one of said MAs, which reads said service provider section for resource contention rules and wherein said resource manager resolves said resource contention based on said resource contention rules.

20. A digital cable network architecture, comprising:
a cable medium;
a plurality of hosts that include a receiver;
a policy file store that contains policy files having a service provider section, a consumer section, and a manufacturer section that can be updated by at least one of said service provider, a consumer and a receiver manufacturer, respectively;
a service provider that is associated with said policy file store, that provides digital cable services over said cable medium to said hosts and that downloads monitor applications (MAs) and policy files to said hosts over said cable medium, wherein said hosts execute said MAs and said MAs use at least one of said service provider section, said consumer section, and said manufacturer section of said policy file to alter fraudulent receiver identification calculations and at least one of alter resource contention and alter service provisioning at levels below a channel level; and
an event manager that communicates with at least one of said MAs and that includes an event/application table, wherein the at least one of said MAs overrides said event/application table to enforce said policy file.

21. A method for providing digital cable services, comprising:
connecting a plurality of hosts that include a receiver to a service provider;
storing policy files having a service provider section, a consumer section, and a manufacturer section in a policy file data store that is associated with said service provider;
allowing at least one of said service provider, a consumer and a receiver manufacturer to alter at least one of said service provider section, said consumer section, and said manufacturer section, respectively, of said policy files;
downloading said policy files to said hosts when changes are made;
using at least one of said service provider section, said consumer section, and said manufacturer section of said policy file to alter fraudulent receiver identification calculations and at least one of alter resource contention and alter service provisioning at levels below a channel level;
managing resources including at least one of tuning resources, audio/video decoding resources, graphics resources and backplane resources;
reading said service provider section of said policy file for resource contention rules when resource contention occurs; and
resolving said resource contention based on said resource contention rules.

22. A method for providing digital cable services, comprising:
connecting a plurality of hosts that include a receiver to a service provider;
storing policy files having a service provider section, a consumer section, and a manufacturer section in a policy file data store that is associated with said service provider;
allowing at least one of said service provider, a consumer and a receiver manufacturer to alter at least one of said service provider section, said consumer section, and said manufacturer section, respectively, of said policy files;
downloading said policy files to said hosts when changes are made;
using at least one of said service provider section, said consumer section, and said manufacturer section of said policy file to alter fraudulent receiver identification calculations and at least one of alter resource contention and alter service provisioning at levels below a channel level;
providing an event manager that includes an event/application notification table; and
overriding said event/application notification table to enforce said policy file.

* * * * *